United States Patent
Mueller et al.

(10) Patent No.: US 7,435,706 B2
(45) Date of Patent: *Oct. 14, 2008

(54) THINNERS FOR INVERT EMULSIONS (75) Inventors: Heinz Mueller, Monheim (DE); Jeff Kirsner, Humble, TX (US); Kimberly Burrows, Kingwood, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 285 days.

This patent is subject to a terminal disclaimer.

(21) Appl. No.: 10/432,787

(22) PCT Filed: Dec. 29, 2000

(86) PCT No.: PCT/US00/35609

§ 371 (c)(1),
(2), (4) Date: Feb. 17, 2004

(87) PCT Pub. No.: WO02/053675

PCT Pub. Date: Jul. 11, 2002

(65) Prior Publication Data

US 2006/0073987 A1     Apr. 6, 2006

(51) Int. Cl.
C09K 8/035 (2006.01)
C09K 8/36 (2006.01)
C09K 8/58 (2006.01)
C09K 8/86 (2006.01)
E21B 43/00 (2006.01)
E21B 43/16 (2006.01)

(52) U.S. Cl. .................. 507/136; 507/129; 507/138; 507/139; 507/239; 507/240; 507/246; 507/261; 507/265; 507/266; 507/267; 166/308.1

(58) Field of Classification Search .................. 507/136, 507/261, 103; 516/30
See application file for complete search history.

(56) References Cited

U.S. PATENT DOCUMENTS 2,816,073 A     12/1957     Stratton (Continued)

FOREIGN PATENT DOCUMENTS

AU     B 75043/94     3/1995

(Continued)

OTHER PUBLICATIONS

A. Saasen, et al, "Prediction of Barite Sag Potential of Drilling Fluids from Rheological Measurements," SPE/IADC 29410 (Feb. 26-Mar. 2, 1995).

(Continued)

Primary Examiner—Randy Gulakowski
Assistant Examiner—John J Figueroa
(74) Attorney, Agent, or Firm—Craig W. Roddy; Karen Tripp

(57) ABSTRACT

A method of reducing the viscosity of oil-based drilling fluids and well service fluids at low temperatures and a thinner compound for use in such drilling fluids and well service fluids is disclosed. The method comprises adding to said drilling fluids or well service fluids a thinner having the formula:

$$R-(C_2H_4O)_n(C_3H_6O)_m(C_4H_8O)_k-H$$

where R is a saturated or unsaturated, linear or branched alkyl radical having about 8 to about 24 carbon atoms, n is a number ranging from about 1 to about 10, m is a number ranging form about 0 to about 10, and k is a number ranging from about 0 to about 10.

20 Claims, 4 Drawing Sheets

U.S. PATENT DOCUMENTS

| | | | |
|---|---|---|---|
| 2,873,253 A | 2/1959 | Stanphill | |
| 2,994,660 A | 8/1961 | Reddie et al. | |
| 3,126,343 A | 3/1964 | Reddie et al. | |
| 3,489,690 A * | 1/1970 | Lachampt et al. | 516/30 |
| 3,654,177 A | 4/1972 | Foley | |
| 3,684,012 A | 8/1972 | Scheffel et al. | |
| 3,728,277 A | 4/1973 | Foley | |
| 3,878,110 A | 4/1975 | Miller et al. | |
| 3,878,117 A | 4/1975 | Williams et al. | |
| 3,912,683 A | 10/1975 | O'Farrell | |
| 3,954,627 A | 5/1976 | Dreher et al. | |
| 3,988,246 A | 10/1976 | Hartfiel | |
| 4,007,149 A | 2/1977 | Burton et al. | |
| 4,010,111 A | 3/1977 | Chappell et al. | |
| 4,012,329 A | 3/1977 | Hayes et al. | |
| 4,142,595 A | 3/1979 | Anderson et al. | |
| 4,148,821 A | 4/1979 | Nussbaum et al. | |
| 4,151,096 A | 4/1979 | Jackson | |
| 4,153,588 A | 5/1979 | Makowski et al. | |
| 4,240,915 A | 12/1980 | Block | |
| 4,255,268 A | 3/1981 | Block | |
| 4,264,455 A | 4/1981 | Block | |
| 4,366,070 A | 12/1982 | Block | |
| 4,390,474 A | 6/1983 | Nussbaum et al. | |
| 4,422,947 A | 12/1983 | Dorsey et al. | |
| 4,425,462 A | 1/1984 | Turner et al. | |
| 4,428,845 A | 1/1984 | Block | |
| 4,447,338 A | 5/1984 | Lundberg et al. | |
| 4,473,479 A | 9/1984 | Block | |
| 4,488,975 A | 12/1984 | Almond | |
| 4,508,628 A | 4/1985 | Walker et al. | |
| 4,552,215 A | 11/1985 | Almond et al. | |
| 4,553,601 A | 11/1985 | Almond et al. | |
| 4,559,233 A | 12/1985 | Chen et al. | |
| 4,619,772 A | 10/1986 | Black et al. | |
| 4,670,501 A | 6/1987 | Dymond et al. | |
| 4,671,883 A | 6/1987 | Connell et al. | |
| 4,777,200 A | 10/1988 | Dymond et al. | |
| 4,787,990 A | 11/1988 | Boyd | |
| 4,802,998 A | 2/1989 | Mueller et al. | |
| 4,810,355 A | 3/1989 | Hopkins | |
| 4,816,551 A | 3/1989 | Oehler et al. | |
| 4,900,456 A | 2/1990 | Ogilvy | |
| 4,941,983 A | 7/1990 | Coates et al. | |
| 4,964,615 A | 10/1990 | Mueller et al. | |
| 5,027,901 A | 7/1991 | French et al. | |
| 5,045,219 A | 9/1991 | Trahan et al. | |
| 5,106,516 A | 4/1992 | Mueller et al. | |
| 5,189,012 A | 2/1993 | Patel et al. | |
| 5,232,910 A | 8/1993 | Mueller et al. | |
| 5,237,080 A | 8/1993 | Daute et al. | |
| 5,252,554 A | 10/1993 | Mueller et al. | |
| 5,254,531 A | 10/1993 | Mueller et al. | |
| 5,308,401 A | 5/1994 | Geke et al. | |
| 5,318,954 A | 6/1994 | Mueller et al. | |
| 5,318,955 A | 6/1994 | Mueller et al. | |
| 5,318,956 A | 6/1994 | Mueller et al. | |
| 5,330,662 A | 7/1994 | Jahnke et al. | |
| 5,333,698 A | 8/1994 | Van Slyke | |
| 5,382,290 A | 1/1995 | Nahm et al. | |
| 5,403,508 A | 4/1995 | Reng et al. | |
| 5,403,822 A | 4/1995 | Mueller et al. | |
| 5,407,909 A | 4/1995 | Goodhue, Jr. et al. | |
| 5,432,152 A | 7/1995 | Dawson | |
| 5,441,927 A | 8/1995 | Mueller et al. | |
| 5,498,596 A | 3/1996 | Ashjian et al. | |
| 5,508,258 A | 4/1996 | Mueller et al. | |
| 5,552,462 A | 9/1996 | Yeh | |
| 5,569,642 A | 10/1996 | Lin | |
| 5,589,442 A | 12/1996 | Gee et al. | |
| 5,591,699 A | 1/1997 | Hodge | |
| 5,605,879 A | 2/1997 | Halliday et al. | |
| 5,607,901 A | 3/1997 | Toups, Jr. et al. | |
| 5,620,946 A * | 4/1997 | Jahnke et al. | 507/131 |
| 5,635,457 A | 6/1997 | Van Slyke | |
| 5,691,281 A | 11/1997 | Ashjian et al. | |
| 5,710,110 A | 1/1998 | Cooperman et al. | |
| 5,744,677 A | 4/1998 | Wu | |
| 5,789,352 A | 8/1998 | Carpenter et al. | |
| 5,837,655 A | 11/1998 | Halliday et al. | |
| 5,846,913 A | 12/1998 | Sawdon | |
| 5,849,974 A | 12/1998 | Clarembeau et al. | |
| 5,851,958 A | 12/1998 | Halliday et al. | |
| RE36,066 E | 1/1999 | Mueller et al. | |
| 5,869,433 A | 2/1999 | Patel | |
| 5,869,434 A | 2/1999 | Mueller et al. | |
| 5,869,917 A | 2/1999 | Ashizawa | |
| 5,877,378 A | 3/1999 | Overstreet et al. | |
| 5,909,779 A | 6/1999 | Patel et al. | |
| 5,929,297 A | 7/1999 | Theriot et al. | |
| 5,942,468 A * | 8/1999 | Dobson et al. | 507/136 |
| 5,958,845 A | 9/1999 | Van Slyke | |
| 5,960,878 A | 10/1999 | Nguyen et al. | |
| 5,989,336 A | 11/1999 | Carpenter et al. | |
| 6,001,790 A | 12/1999 | Schmitt et al. | |
| 6,017,854 A | 1/2000 | Van Slyke | |
| 6,022,833 A | 2/2000 | Mueller et al. | |
| 6,034,037 A | 3/2000 | Van Slyke | |
| 6,090,754 A | 7/2000 | Chan et al. | |
| 6,107,255 A | 8/2000 | Van Slyke | |
| 6,110,874 A | 8/2000 | Van Slyke | |
| 6,159,906 A | 12/2000 | McNally et al. | |
| 6,165,946 A | 12/2000 | Mueller et al. | |
| 6,180,572 B1 | 1/2001 | Mueller et al. | |
| 6,187,719 B1 | 2/2001 | Dino et al. | |
| 6,204,224 B1 | 3/2001 | Quintero et al. | |
| 6,211,119 B1 | 4/2001 | Herold et al. | |
| 6,289,989 B1 | 9/2001 | Heinz Mueller et al. | |
| 6,339,048 B1 | 1/2002 | Santhanam et al. | |
| 6,451,953 B1 | 9/2002 | Albright | |
| 6,462,096 B1 | 10/2002 | Dino et al. | |
| 6,515,031 B2 | 2/2003 | Fefer | |
| 6,589,917 B2 | 7/2003 | Patel | |
| 6,620,770 B1 | 9/2003 | Kirsner et al. | |
| 6,828,279 B2 | 12/2004 | Patel et al. | |
| 6,861,393 B2 | 3/2005 | Temple et al. | |
| 6,887,832 B2 | 5/2005 | Kirsner et al. | |
| 6,908,887 B2 | 6/2005 | Thaemlitz | |
| 6,989,353 B2 | 1/2006 | Temple et al. | |
| 7,008,907 B2 | 3/2006 | Kirsner et al. | |
| 2001/0009890 A1 | 7/2001 | Patel et al. | |
| 2003/0036484 A1 | 2/2003 | Kirsner et al. | |
| 2003/0064897 A1 | 4/2003 | Kirsner et al. | |
| 2003/0114316 A1 | 6/2003 | Patel et al. | |
| 2003/0144153 A1 | 7/2003 | Kirsner et al. | |
| 2004/0043905 A1 | 3/2004 | Miller et al. | |
| 2004/0082483 A1 | 4/2004 | Muller et al. | |
| 2004/0102332 A1 | 5/2004 | Thompson et al. | |
| 2004/0110642 A1 | 6/2004 | Thompson et al. | |
| 2004/0152603 A1 | 8/2004 | Kirsner et al. | |
| 2004/0171498 A1 | 9/2004 | Miller | |
| 2005/0032652 A1 | 2/2005 | Kirsner et al. | |
| 2005/0137093 A1 | 6/2005 | Miller | |
| 2006/0073987 A1 | 4/2006 | Mueller et al. | |
| 2007/0078060 A1 | 4/2007 | Kirsner et al. | |
| 2007/0078061 A1 | 4/2007 | Kirsner et al. | |
| 2007/0078062 A1 | 4/2007 | Kirsner et al. | |
| 2007/0082824 A1 | 4/2007 | Bell et al. | |
| 2007/0082922 A1 | 4/2007 | Kirsner et al. | |

FOREIGN PATENT DOCUMENTS

| | | |
|---|---|---|
| CA | 2 088 697 | 2/1992 |
| DE | 40 18 228 A1 | 6/1990 |

| | | |
|---|---|---|
| DE | 44 20 455 A1 | 12/1995 |
| DE | 196 43 840 A1 | 10/1996 |
| DE | 196 43 857 A1 | 5/1998 |
| EP | 0134173 A1 | 8/1984 |
| EP | 0 124 194 A2 | 11/1984 |
| EP | 0 247 801 | 5/1987 |
| EP | 0 254 412 B1 | 1/1988 |
| EP | 0 124 194 B1 | 3/1988 |
| EP | 0 247 801 B1 | 11/1990 |
| EP | 0561 608 A2 | 9/1993 |
| EP | 1 111 024 A1 | 6/2001 |
| EP | 1 111 024 B1 | 10/2004 |
| GB | 2166782 A | 5/1986 |
| GB | 2212192 A | 7/1989 |
| GB | 2 287 052 A | 3/1994 |
| GB | 2287052 B | 3/1996 |
| GB | 2309240 A | 7/1997 |
| WO | WO 83/02949 | 9/1983 |
| WO | WO 95/21225 | 8/1985 |
| WO | WO 93/23491 A | 11/1993 |
| WO | WO 94/16030 | 7/1994 |
| WO | WO 95/09215 | 4/1995 |
| WO | WO 95 26386 | 10/1995 |
| WO | WO 96 22342 | 7/1996 |
| WO | WO 96/22342 | 7/1996 |
| WO | WO 98/18882 | 5/1998 |
| WO | WO 99 50370 A | 10/1999 |
| WO | WO 00 71241 A | 11/2000 |
| WO | WO 02/053675 A1 | 7/2002 |
| WO | WO 02/053676 A1 | 7/2002 |

OTHER PUBLICATIONS

P.I. Reid, et al, "Fluid Evaluation of a Novel Inhibitive Water-Based Drilling Fluid for Tertiary Shales," SPE 24979 (Nov. 16-18, 1992).
W. Hite, et al, Better Practices and Synthetic Fluid Improve Drilling Rates, Oil & Gas J. Online (Feb. 20, 1995).
N. Hands, et al, "Drill-in Fluid Reduces Formation Damage, Increases Production Rates," Oil & Gas J. Online (1998).
J.P. Plank, "Water-Based Muds Using Synthetic Polymers Developed for High Temperature Drilling," Oil & Gas J. Online (1992).
Brookfield Instruction Manual for SSV Vane Standard Spindle Set.
Brookfield Press Release on Vane Spindles (Mar. 12, 2002), ThomasNet Product News Room.
EPA Development Document for Proposed Effluent Limitations Guidelines for Standards for Synthetic-Based Drilling Fluid and Other Non-Aqueous Drilling Fluids . . . (Feb. 1999).
Environmental Impacts of Synthetic Based Drilling Fluids, U.S. Dept of the Interior, Minerals Management Service, Aug. 2000.
EPA Environmental Assessment of Proposed Effluent Limitations Guidelines for Synthetic-Based Drilling Fluids and Other Non-Aqueous Drilling Fluids . . . (Feb. 1999).
Plaintiff's Initial Disclosures, Civil Action 6.05CV155, US Dist. Ct. (ED TX), *Halliburton Energy Services, Inc.* v. *M-I, LLC*, Sep. 16, 2005.
Defendant M-I, LLC's Initial Disclosures, Civil Action 6.05CV155, US Dist. Ct. (ED TX), *Halliburton Energy Services, Inc.* v. *M-I, LLC*, Aug. 19, 2005.
Plaintiff Halliburton's Objections and Responses to Defendant M-I LLC's First Set of Requests for Production, Civil Action 6.05CV155, *Halliburton* v. *MI*, Aug. 26, 2005.
Plaintiff Halliburton's Objections and Responses to Defendant M-I LLC's First Set of Interrogatories, Civil Action 6.05CV155, *Halliburton* v. *MI*, Aug. 26, 2005.
Plaintiff Halliburton's Supplemental Responses and Objections to Defendant M-I LLC's First Set of Interrogatories, Civil Action 6.05CV155, *Halliburton* v. *MI*, Oct. 25, 2005.
M-I, LLC's Responses to Plaintiff's First Set of Interrogatories to Defendant (Nos. 1-21), Civil Action 6.05CV155, US Dist. Ct. (ED TX), *Halliburton* v. *MI*, Nov. 16, 2005.
Halliburton's Opening Brief on Claim Construction,Civil Action 6.05CV155, US Dist. Ct. (ED TX), *Halliburton Energy Services, Inc.* v. *M-I, LLC*, Mar. 17, 2006.

Halliburton's Unopposed Motion for Leave to Exceed Page Limit for its Markman Brief, CV 6.05CV155, US Dist. Ct., *Halliburton Energy Services, Inc.* v. *M-I, LLC*, Mar. 17, 2006.
Defendant M-I, LLC's Reply in Support of its Motion for Summary Judgment of Invalidity with Respect to U.S. Patent No. 6,887,832 with exhibits.
M-I, LLC's Responsive Brief on the Construction of the Asserted Claims of U.S. Patent No. 6,887,832 with exhibits.
Halliburton's Unopposed Motion for Leave to Exceed Page Limit for its Surreply in Opposition to M-I's Motion for Summary Judgment of Invalidity with the Surreply and other exh.
Halliburton's Unopposed Motion for Leave to Exceed Page Limit for Reply Brief on Claim Construction with the Reply Brief and other exhibits.
Boyd, Whitfill, Carter, & Allamon, "New Based Oil Used in Low Toxicity Oil Muds", 1985.
Friedheim, J.E., "Second Generation Drilling Fluids", 1996.
Power, Friedheim & Troups, M-I LLC., "Flat Rheology SBM Shows Promise in Deepwater", Drilling Contractor, 2003.
"Bio-Bore", (TM) Horizontal Directional Drilling Fluid Concentrate, Baroid Products Data Sheet, (2003).
Halliburton Energy Services, Baroid Technology, Eng. & Dev. Lab. Tech. Serv. (TS-2058) Dimmer and Trimer Eval. as Primary Viscosifiers, Using,"PETROFREE" Apr. 17, 2001.
Halliburton Energy Services, Baroid Technology, Eng. & Dev. Lab. Tech. Serv. (TS-2055) Addition of Dimer & Trimer Modifiers to MI NOVADRIL. Drilling Fluid. Apr. 4, 2001.
Halliburton Energy Services, Baroid Technology, Eng. & Dev. Lab. Tech. Serv. (TS-2039) Primary Rheological Eval. Using Various Dimer & Trimer Acids. Feb. 21, 2001.
Halliburton Energy Services, Baroid Technology, Eng. & Dev. Lab. Tech. Serv. (TS-2037) Primary Rheological Eval. Using Various Dimer & Trimer Acids. Feb. 21, 2001.
Bariod, A. Halliburton Co., Report FM-0691, Proj. Q3767, Formulation Work on an 11, 14 & 16lb/gal. OI Drilling Fluid, Internal Memorandum, Nov. 5, 1999.
Baroid Drilling Fluids, Res. & Eng. & Anal.Serv/Support (TS-0724), Fann 70 Analysis of PETROFREE Muds. Nov. 12, 1993.
Baroid Report No. EMB-5680, project No. M386. Aug. 8, 1995.
Baroid Report No. EMB-5723, project No. M565. Dec. 8, 1995.
Baroid Report No. EMB-5718, project No. M630. Dec. 1, 1995.
Baroid Drilling Fluids, Res. & Eng. & Anal. Serv/Support. (TS-1446S1), Compound of Downhole Rheological & Suspension Prop. of a *PETROFREE mud* vs. *PETROFREE LE mud* Nov. 22, 1996.
Baroid Drilling Fluids, Res. & Eng. & Anal. Serv/Support. (TS-0865), Compound of a 13.4lb/gal PETROFREE mud Dec. 6, 1994.
Baroid Drilling Fluids, Res. & Eng. Report No. EMB 5408, Project No. 1559, Test Sample of a Submitted Sample Jul. 12, 1994.
Baroid Drilling Fluids, Res. & Eng. & Anal. Serv/Support. (EMB 5530), Analysis of a PETROFREE Muds & Coatings from a Well. Jan. 27, 1995.
Halliburton, Baroid Tech., Eng. & Dev. Lab. Internal Mem., Report No. FM1376, Project No. Q 865, Fann 75 Rheological Properties on the Novaplus Fluids. Jul. 30, 2002.
Baroid Drilling Fluids, Res. & Eng. & Anal. Serv/Support. (TS-0842), Eval. & Reconditioning of a PETROFREE Mud. Oct. 7, 1994.
Baroid Drilling Fluids, Res. & Eng. & Anal. Serv/Support Field Service Report (FS-0058), PETROFREE Nov. 14, 1996-Dec. 3, 1996.
Baroid Drilling Fluids, Res. & Eng. & Anal. Serv/Support. (TS-1193), Analysis of a PETROFREE LE Muds to Determine the Cause of High Viscosities at Cold Temperatures. Jan. 30, 1997.
Baroid, a Halliburton Company, Res. & Eng., Tech. & Anal. Serv./Support (FS-0082), Field Support for Utilizing 13.0lb/gal. 75 PETROFREE SF Drilling Fluid Feb. 4, 2000.
Baroid Drilling Fluids, Res. & Eng., Tech. & Anal. Serv./Support Field Services (FS-0058S2), Relating to PETROFREE LE Jan. 24, 1997.
Baroid Drilling Fluids, Res. & Eng., Tech. & Anal. Serv./Support (TS-0906), Formulation of an Enviromul and Petrofree mud Weighted with BARCARB May 19, 1998.
Baroid Drilling Fluids, Res. & Eng., Tech. & Anal. Serv./Support (TS-0870), Formulation of a Low Yield Point Mud Jan. 11, 1995.

Baroid Drilling Fluids, Res. & Eng., Tech. & Anal. Serv./Support (TS-0494), a 15 lb/gal. PETROFREE Formulation Nov. 22, 1991.
Baroid Drilling Fluids, Res. & Eng., Tech. & Anal. Serv./Support (TS-0485), 300 F Static Aging Evaluation of *Petrofree* vs *Enviromul*. Nov. 6, 1991.
Baroid Drilling Fluids, Res. & Eng., Tech. & Anal. Serv./Support Field Service Report Dec. 2, 1996-Dec. 16, 1996 (FS-0058S) Feb. 11, 1997.
Baroid, a Halliburton Company, Test of A Petrofree LV Mud Sample Well, OCS-G 14205 #5, Jul. 10, 2000.
Comparison of PETROFREE, Internal Olefin and Low Viscosity Ester Muds, 40 F to 250 F, 0 psi to 12,000 psi (16 pg).
Baroid, Halliburton, Low Viscosity Ester Fluids Technical Review (50 pages), no date available.
Baroid, a Halliburton Company, Internal Memo., Report No. FM-0700, Project No. Q3854, Extended Gel Strengths for a Low Viscosity Ester and a PETROFREE Mud Nov. 11, 1999.
Baroid Drilling Fluids, Res. & Eng., Tech. & Anal. Serv/Support (EMB-5696), Adjustment of a Stored PETROFREE Mud to Meet Specifications Required. Oct. 6, 1995.
Thinner Evaluation 11.0 lb/gal., 70/30 OWR Petreofree Mud, Thinner Evaluated: COLDROL, ATC. BDF-239, QMC 42, Deep-Treat (Halb002174-Halb002179), no date available.
Westport Technology Center International, Drilling Fluids and Cement, Analysis of a Baroid PETROFREE Synthetic Mud, WTCI-94-133, Nov. 1994.
Deposition of Heinz Mueller in Civil Action 6:05cv155, *Halliburton* v *M-I*, US Dist. Ct. Eastern District of Texas.
Halliburton's Opposition to Defendant's Motion for Summary Judgement of Invalidity in Civ. Action 6:05cv155, *Halliburton* v *M-I*, Eastern District of Texas.
Memorandum and Opinion of the Court, Signed Oct. 18, 2006 in Civ. Action 6:05cv155, *Halliburton* v *M-I*, Eastern District of Texas.
US PTO Office Action of Nov. 10, 2005 in U.S. Appl. No. 10/656,684.
US PTO Office Action of Jul. 21, 2006 in U.S. Appl. No. 10/656,684.
US PTO Notice of Allowance Dec. 1, 2004 in U.S. Appl. No. 10/175,272.
US PTO Office Action of Jun. 27, 2006 in U.S. Appl. No. 10/432,787.
PCT International Search Report in PCT/US00/35609 Corresponding to U.S. Appl. No. 10/432,787.
US PTO Office Action of Oct. 4, 2002 in U.S. Appl. No. 09/929,465.
PCT International Preliminary Examination Report in PCT/US00/35610 Corresponding to U.S. Appl. No. 10/432,786.
Dow TERGITOL Surfactants Product Information Sheet from www.dow.com/surfacants/products/nonlph.html. Retrieved on Mar. 11, 2005.
Shell NEODOL Product Information Sheets from www.shellchemicals.com/neodol/1,1098,506.html. Retrieved on Mar. 11, 2005.
Litigation Documents Regarding Related U.S. Patent No. 6,887,832 Issued May 3, 2005, Being Filed Herewith in Accord with MPEP 2001.06(c).
Baroid Drilling Fluids Product Information Sheet on RM-63, Rheology Modifier (1990) 2 pages.
Baroid Drilling Fluids Product Data Sheets (1993) 121 Pages.
Manual of Drilling Fluids Technology, Fundamental Characteristics of Drilling Fluid, NL Baroid/NL Industries, Inc. (1979) 22 pages.
Halliburton Drilling Fluids Technology, Introduction to Drilling, Dril-N 7 Completion Fluids, no date available.
Minute Entry for Markman Hearing Proceedings in *Halliburton* v *M-I*, Civ. Action 6:05cv155, U. S. District Ct. Eastern District Texas.
Transcript of Markman Hearing Proceedings in *Halliburton* v *M-I*, Civ. Action 6:05cv155, U. S. District Ct. Eastern District Texas.
Ja Toupe, Jr., Westport Technology Center International, Report of Fann 70 Testing of Nine OBM Drilling Fluid Samples from M-I, Inteq., and Baroid for BP Amoco, Aug. 2001.
Baroid Drilling Fluids Product Data Sheets (1993) (121 pages).
Halliburton Drilling Fluids Technology—Introduction to Drilling, Dril-N & Completion Fluids, no date available.
Minute Entry for Markman Hearing Proceedings in *Halliburton* v. *M-I*, 6-05cv155, U.S. District Ct., Eastern District of Texas.
Transcript of Markman Hearing Before Hon. L. Davis in *Halliburton* v. *M-I*, 6-05cv155, U.S. District Ct., Eastern District of Texas.
Baroid's Environmentally Safe Fluids—PETROFREE LV, ACCOLADE (31 pages).
ALFONIC (R) Alcohol Ethoxylates from Low Range Alcohols C5-C10 product technical data sheet, SASOL North America, Inc., dated Jan. 2003 (3 pages).
Chapter 13, Synthetics, Baroid Fluids Handbook, Rev. Aug. 1, 1997 (27 pages).
Mac Seheult, et al, Biopolymer Fluids Eliminate Horizontal Well Problems, World Oil, Jan. 1990, pp. 49-53.
Synthetic-Base Fluid Reduces Downhole Losses, Hart's E&P SPE. Merit Award for Eng. Innov., Judges Choose Top 14 Indus. Proj., www. #and Pnet.com, Hart's E&P, Apr. 2003 (10 pp).
Halliburton Energy Services Baroid Technology Eng. & Dev. Lab. Tech. Serv. Dimer and Trimer Low-End Rheology Modifier Study at Higher Conc. & Temp. TS-2065, Jun. 12, 2001.
Baroid Drilling Fluids R&E Tech. & Analytical Serv./Support, TS-0858, Determination of the Max. Density for a 60/40 Ester/Water Ratio PETROFREE (R) Mud, Dec. 12, 1994.
MI VERSAMUL (R) Multi Purpose Emulsifier Product Bulletin (2 pages) 1996.
MI VERSATHIN (R) Deflocculant Product Bulletin (2 pages) 1996.
MI VERSAWET(R) Organic Surfactant Product Bulletin (2 pages) 1996.
MI VERSAMOD (TM) Organic Gelling Agent Product Bulletin (2 pages) 1996.
MI VERSAPAC (TM) Rheological Additive Product Bulletin (2 pages) 1999.
MI VERSALIG (R) Amine Treated Lignite Control Additive Product Bulletin (2 pages) 1997.
MI VERSALUBE (TM) Lubricant Product Bulletin (2 pages) 1999.
MI NOVAMOD (TM) Organic Gelling Agent Lliguid Rheology Modifier (2 pages) 1997.
Baroid ADAPTA (TM) Copolymer HPHT Filtration Reducer Product Information Sheet (1 page) 2001.
PCT International Search Report for PCT/US 00/35610 corresponding to U.S. Appl. No. 10/432,786, Aug. 8, 2001, 5 pages.
AADE-07-NTCE-20, Increased Deepwater Drilling Performance Using Constant Rheology Synthetic-Based Mud by Rojas, et al., Apr. 10-12, 2007 (9 pages).
Seheult , et al., "Biopolymer Fluids Eliminate Horizontal Well Problems," Jan. 1990 World Oil, pp. 49-53.
"Fluids Are Key in Drilling Highly Deviated Wells" by Byrd, et al., Feb. 1988 Petroleum Engineer Int'l, pp. 24-26.
2003 Engineering Innovation MEA Winners, EandPnet.com, HART's E&P Apr. 2003, 10 pages, including "Synthetic-base fluid reduces downhole losses".
SPE 50394, Optimising Inflow Performance of a Long Multi-Lateral Offshore Well in Low Permeability, Gas Bearing Sanstone . . . by Hands, et al., Nov. 1-4, 1998, 14 pages.
PETROFREE(TM), The Biodegradable Solution for High-Performance Drilling, Baroid Drilling Fluids, 1992, 8 pages.
Recommended Practice Standard Procedure for Field Testing Oil-Based Drilling Fluids, API Recommended Practice 13B-2, 3d ed., Feb. 1998.
Supp. May 1, 2000, to Standard Procedure for Field Testing Oil-Based Drilling Fluids, API Recommended Practice 13B-2, 3d ed., Feb. 1998.
Baroid Drilling Fluids, Internal Report No. EMB-5408, Jul. 22, 1994, Test of a Submitted Sample, 4 pages.
Baroid Drilling Fluids, R&E Tech & Analytical Services/Support Report No. TS-0724, FANN 70 Analysis of Petrofree Muds, Nov. 12, 1993, 15 pages.
Baroid Internal Memo Report No. FM-0691 on Formulation work on an 11, 14, and 16 ll/gal. IO drilling fluid, Nov. 5, 1999, 22 pages.
Baroid Drilling Fluids R&E Tech. & Analytical Services/Support Report on Rheological Properties of Petrofree after Aging at Low & High Temp. TS-1037, Mar. 19, 1996, 5 pp.
Baroid Drilling Fluids R&E TEch. & Analytical Services/Support Report on Analysis of Petrofree Muds and Cutting , EMB-5530, Jan. 27, 1995, 16 pages.

Halliburton Report No. FM-1376 on Fann 75 Rheological Properties on the NovaPlus Fluids, Jul. 30, 2002, 3 pages.
Baroid Drilling Fluids R&E Tech. & Analytical Services/Support Report FS-0058, Nov. 14-Dec. 3, 1996, 17 pages.
Baroid Drilling Fluids R&E Tech. & Analytical Services/Support Report TS-0906, Formulation of an Enviromul and Petrofree Mud . . . May 8, 1995, 5 pp.
Baroid Drilling Fluids R&E Tech. & Analytical Services/Support Report No. TS-0870, Formulation of a Low Yield Point Mud, Jan. 11, 1995, 3 pages.
Baroid Drilling Fluids R&E Tech. & Analytical Services/Support Report No. TS-0494, A 15 LB/Gal Petrofree Fromulation , Nov. 22, 1991, 3 pages.
Baroid Drilling Fluids R&E TEch. & Analytical Services Report No. TS-0485, 300 Degrees F Static Aging Evaluation of *Petrofree* vs. *Enviromul*, Nov. 16, 1991, 5 pages.
Baroid, Report on a Test of a Petrofree LV Mud Sample, Jul. 10, 2000, 5 pages.
Baroid R&E Tech. & Analytical Services/Support Report FS-0080, Field Support Utililzing an 11.2 lb/gal Petrofree IO Drilling Fluid, Dec. 29, 1999, 2 pages.
Baroid's Environmentally Safe Fluids Petrofree LV, ACCOLADE, 32 pages, not dated.
Baroid R&E Lab., Comparative Data, Petrofree SF & Petrofree LE, 11.0 lb/gal, 70/30 OWR, 14 pages, not dated.
Baroid R&E TEch. & Analytical Services/Support Report FS-0082, Field Support Utilizing a 13.0 lb/gal Petrofree SF Drilling Fluid, Feb. 4, 2000, 7 pages.
EP Article 96(2) Examination Report of Feb. 10, 2006 for European Patent Application No. 00989597.0 Corresponding to U.S. Appl. No. 10/432,787.
EP Article 96(2) Examination Report of Apr. 20, 2006 for European Patent Application No. 00989597.0 Corresponding to U.S. Appl. No. 10/432,786.
ALFONIC Alcohol Ethoxylates from Low Range Alcohols C6-C10, SASOL North America Technical Data Sheet, Rev. Jan. 2003, 3 pages.
PCT International Search Report for PCT/US0035610, corresponding to U.S. Appl. No. 10/432,786, dated Aug. 8, 2001, 5 pages.
PCT International Search Report for PCT/US0035609, corresponding to U.S. Appl. No. 10/432,787, dated Mar. 28, 2001, 5 pages.
Halliburton Energy Services E&D Lab Tech. Services, Report TS-2065, Dimer & Trimer Low-End Rheology Modifier Study at Higher Concentrations & Temp., Jun. 12, 2001, 54 pages.
AADE-04-DF-HO-36, Case Histroy: Zero Whole Mud Losses Achieved During Casing and Cementing Operations . . . by Patrickis, et al., Apr. 6-7, 2004, 8 pages.
AADE-05-NTCE-28, The Pro's and Con's of Flat Rheology Drilling Fluids, by Mullen, et al., Apr. 5-7, 2005, 16 pages.
Jim Friedheim, "Flat Rheology Mud Shows Promise in Deepwater GOM Trials," Jun. 2004 OFFSHORE, 4 pages.
US PTO Office Action of Sep. 15, 2006 in U.S. Appl. No. 10/432,786.
US PTO Office Action of Dec. 28, 2005 in U.S. Appl. No. 10/432,786.
US PTO Office Action of Nov. 30, 2006 in U.S. Appl. No. 10/432,786.
U.S. PTO Office Action of Sep. 15, 2006 in U.S. Appl. No. 10/432,786.
U.S. PTO Office Action of Mar. 7, 2007 in U.S. Appl. No. 10/432,786.
U.S. PTO Office Action of Jan. 30, 2007 in U.S. Appl. No. 10/761,552.
U.S. PTO Office Action of Feb. 6, 2006 in U.S. Appl. No. 10/761,552.
U.S. PTO Office Action of May 31, 2006 in U.S. Appl. No. 10/761,552.
U.S. PTO Office Action of Nov. 30, 2006 in U.S. Appl. No. 10/432,786.
U.S. PTO Office Action of Oct. 4, 2002 in U.S. Appl. No. 09/929,465.
U.S. PTO Office Action of Jun. 24, 2003 in U.S. Appl. No. 09/929,465.
U.S. PTO Office Action of Apr. 16, 2004 in U.S. Appl. No. 09/929,465.
U.S. PTO Office Action of Jan. 21, 2005 in U.S. Appl. No. 09/929,465.
U.S. PTO Office Action of Sep. 29, 2005 in U.S. Appl. No. 09/929,465.
U.S. PTO Office Action of Nov. 9, 2006 in U.S. Appl. No. 09/929,465.
U.S. PTO Notice of Allowance and Fee(s) Due in U.S. Appl. No. 09/929,465, mailed Apr. 11, 2006.
U.S. PTO Office Action of Jun. 4, 2004 in U.S. Appl. No. 10/175,272.
U.S. PTO Office Action of Dec. 1, 2004 in U.S. Appl. No. 10/175,272.
U.S. PTO Office Action of Jul. 17, 2007 in U.S. Appl. No. 10/933,560.
U.S. PTO Examiner Interview Summary mailed Jul. 27, 2007 in U.S. Appl. No. 10/933,560.
U.S. PTO Notice of Allowance and Fee(s) Due for U.S. Appl. No. 10/933,560, mailed Aug. 13, 2007.
U.S. PTO Notice of Allowability of U.S. Appl. No. 10/933,560, mailed Aug. 13, 2007.
U.S. PTO Office Action of May 21, 2007 in U.S. Appl. No. 10/292,124.
U.S. PTO Office Action of Apr. 17, 2007 in U.S. Appl. No. 10/292,124.
Interview Summary by Attorney filed in U.S. Appl. No. 10/292,124 on May 10, 2007.
Brief of Plantiff-Appellant Halliburton in Appeal 2007-1149 before the Federal Circuit in *Halliburton* v. *MI*, dated Apr. 25, 2007 related to U.S. Appl. No. 6,887,832.
Brief of Defendant-Appellee MI in Appeal 2007-1149 before the Federal Circuit in *Halliburton* v. *MI*, dated Jun. 25, 2007 related to U.S. Appl. No. 6,887,832.
Corrected Reply Brief of Plantiff-Appellant Halliburton in Appeal 2007-1149 before the Federal Circuit in *Halliburton* v. *MI*, dated Jul. 24, 2007.
Baroid Drilling Fluids, Inc. brochure entitled "Petrofree ™ The Biodegradable Solution for High-Performance Drilling," (1998) 8 pages.
A. Samuels, "H2S Need Not Be Deadly, Dangerous, Destructive," Soc. Petroleum Engineers, SPE 5202, (1974).
R.K. Clark, et al., "Polyacrylamide/Potassium-Chloride Mud for Drilling Water-Sensitive Shales," J Petroleum Tech. 719-729 SPE 5514 (Jun. 1976).
J.E. Friedheim, et al, "An Environmentally Superior Replacement for Mineral-Oil Drilling Fluids," 299-312, SPE 23062 (Sep. 3-6, 1991).
J.H. Rushing, et al., "Bioaccumulation from Mineral Oil-Wet and Synthetic Liquid-Wet Cuttings in an Estuarine Fish," 311-320, SPE 23350 (Nov. 10-14, 1991).
F.V. Jones, et al, "The Chronic Toxicity of Mineral Oil-Wet and Synthetic Liquid-Wet Cuttings on an Estuarine Fish, *Fundulus grandis*," 721-730, SPE 23497 (Nov. 10-13, 1991).
J.E. Friedheim, et al., "Superior Performance with Minimal Environmental Impact: A Novel Nonaqueous Drilling Fluid," 713-726, SPE 25753 (Feb. 23-25, 1983).
S. Park, et al., "The Success of Synthetic-Based Drilling Fluids Offshore Gulf of Mexico: A Field Comparison to Conventional Systems," 405-418, SPE 26354 (1993).
M. Slater, "Commonly Used Biodegradation Techniques for Drilling Fluid Chemicals, Are They Appropriate," 387-397, SPE/IADC 29376 (1995).
J. Candler, et al., "Seafloor Monitoring for Synthetic-Based Mud Discharged in the Western Gulf of Mexico," 51-69, SPE 29694 (1995).
J.E. Friedheim, et al, "Second Generation Synthetic Fluids in the North Sea: Are They Better?", 215-226, IADS/SPE 350061 (1996).
M.A. Legendre Zevallos, et al., "Synthetic-Based Fluids Enhance Environmental and Drilling Performance in Deepwater Locations," 235-242, SPE 35329 (1996).
E.A. Vik, et al, "Factors Affecting Methods for Biodegradation Testing of Drilling Fluids for Marine Discharge," 697-711, SPE 35981 (1996).
L. Bailey, et al., "Filtercake Integrity and Reservoir Damage," 111-120, SPE 39429, (1998).
P.A. Bern, et al., "Barite Sag: Measurement, Modeling and Management," IADC/SPE 47784 (9 pages) (1998).

N. Hands, et al., "Optimising Inflow Performance of a Long Multi-Lateral Offshore Well in Low Permeability Gas Bearing Sandstone: K14-FB 102 Case Study," SPE 50394 (1998) 14.

L. Xiao, et al., "Studies on the Damage Induced by Drilling Fluids in Limestone Cores," SPE 50711 (17 pages) (1999).

A. Meinhold, "Framework for a Comparative Environmental Assessment of Drilling Fluids Used Offshore," SPE 52746 (10 pages) (1999).

L.J. Fraser, et al., "Formation-Damaging Characteristics of Mixed Metal Hydroxide Drill-In Fluids and a Comparison with Polymer-Base Fluids," SPE 57714 (1999).

P.A. Bern, et al, "Barite Sag: Measurement, Modeling, and Management," SPE 62051, SPE Drill. & Completion 15(1) 25-30 (Mar. 2000).

W. Hite, et al, Better Practices and Synthetic Fluid Improve Drilling Rates, Oil & Gas J. Online (Feb. 20, 1995).

Brookfield Instruction Manual for SSV Vane Standard Spindle Set (2002).

"Horizontal Wells Offer Economic Advantage," Horizontal News, Fall 1996.

A. Saasen, et al, "Monitoring of Barite Sag Important in Deviated Drilling," Oil & Gas J. Online (1991).

Novadril (TM) System, MI Technology Report (1993).

G. Robinson et al, Novel Viscometer for Improved Drilling Fluid Characterization, Baker Hughes INTEQ (1996).

N.J. Alderman, et al, "Vane Rheometry of Bentonite Gels," 39 J. Non-Newtonian Fluid Mechanics 291-310 (1991).

API Recommended Practice Standard Procedure for Field Testing Oil-Based Drilling Fluids, API Rec. Prac. 13B—2, 3rd. ed. (Feb. 1998) American Petroleum Institute.

Deposition Transcript of David Carbajal, co-inventor of US 6,887,832 in Civil Action 6.05CV155, US Dist. Ct. (E.D. TX), *Halliburton Energy Serv.* v. *M-I*, LLC (Jan. 12, 2006).

Deposition Transcript of Kimberly Burrows, co-inventor of US 6,887,832 in Civil Action 6.05CV155, US Dist. Ct. (E.D. TX), *Halliburton Energy Serv.* v. *M-I*, LLC (Oct. 26, 2005).

Deposition Transcript of Don Siems, co-inventor of US 6,887,832 in Civil Action 6.05CV155, US Dist. Ct. (E.D. TX), *Halliburton Energy Serv.* v. *M-I*, LLC (Dec. 12, 2005).

Deposition Transcript of Jeff Kirsner, co-inventor of US 6,887,832 in Civil Action 6.05CV155, US Dist. Ct. (E.D. TX), *Halliburton Energy Serv.* v. *M-I*, LLC (Feb. 15, 2006).

Deposition Transcript of Karen Tripp, patent prosecuting attorney for US 6,887,832, CV 6:05CV155, US Dist. Ct. (E.D. TX), *Halliburton Energy Serv.* v. *M-I, LLC.*, filed Jan. 26, 2006.

First Amended Complaint, Civil Action No. 6:05CV155, U.S. Dist. Court, Eastern Dist. of Texas, Tyler Div., *Halliburton Energy Services, Inc.* v. *M-I, LLC.*, filed Jan. 27, 1006.

M-I, LLC's 2nd Amended Answer, Affirmative Defenses, and Counterclaims, Civil Action No. 6:05CV155, U.S. Dist. Court, Eastern Dist. of Texas, Tyler Div., filed Feb. 10, 2006.

Plaintiff's Preliminary Infringement Contentions, Civil Action No. 6:05CV155, U.S. Dist. Court, Eastern Dist. of Texas, *Halliburton Energy Services, Inc.* v. *M-I LLC*, Sep. 16, 2005.

M-I, LLC's Preliminary Invalidity Contentions, CA No. 6:05CV155, U.S. Dist. Court, Eastern Dist. of Texas, *Halliburton Energy Services, Inc.* v. *M-I, LLC*, Oct. 28, 2005.

K. Burrows, et al., "New Loop Viscosity Ester is Suitable for Drilling Fluids in Deepwater Applications," SPE 66553, Feb. 2001 (14 pages).

L.F. Nicora, "High-Density Invert-Emulsion System with Very Low Solids Content to Drill ERD and HPHT Wells," SPE 65000, Feb. 2001 (17 pages).

D. Eckhout, et al., "Development Process and Field Applications of a New Ester-based Mud System for ERD Wells on Australia's Northwest Shelf," IADC/SPE 62791 (Sep. 2002).

M. Mas, et al, "A New High-Temperature Oil-Based Drilling Fluid," SPE 53941, Venezuela Apr. 1999 (14 pages).

C. Cameron, et al, "Drilling Fluids Design and Management for Extended Reach Drilling," IADC/SPE 72290, Oct. 2001 (7 pages).

L. Knox, et al, "New Developments in Ester-based Mud Technology," AADE-02-DFWM-HO-41, Apr. 2002 (9 pages).

L.J. Fraser, "Field Application of the All-Oil Drilling Fluid," IADC/SPE 19955, Feb. 27-Mar. 2, 1990).

Halliburton's Proposed Terms and Claim Elements for Construction, CV 6.05CV155, US Dist. Ct.(E.D. TX), *Halliburton Energy Serv.* v. *M-I, LLC*, Nov. 21, 2005.

Defendant M-I, L.L.C.'s List of Disputed Claim Terms, Civil Action No. 6:05CV155, U.S. Dist. Court, (E.D. TX), *Halliburton Energy Services, Inc.* v. *M-I LLC*, Nov. 21, 2005.

Plaintiff's Preliminary Claim Constructions Pursuant to Local Patent Rule 4-2, CV 6.05CV155, US Dist. Ct. (E.D. TX), *Halliburton Energy Serv.* v. *M-I, LLC*, Dec. 23, 2005.

Defendant M-I, LLC's Preliminary Claim Construction and Identification of Extrinsic Evidence for U.S. Patent No. 6,887,832, CV 6.05CV155, US Dist. Ct. (E.D. TX),Dec. 23, 2005.

Joint Claim Construction and Prehearing Statement Pursuant to P.R. 4-3, CV 6.05CV155, US Dist. Ct. (ED TX), *Halliburton Energy Serv.* v. *M-I, LLC* Jan. 20, 2006.

Defendant M-I, LLC's Motion for Summary Judgment of Invalidity with Respect to U.S. Patent No. 6,887,832.

M-I LLC's Motion for Leave to Add Inequitable Conduct Defense to its Pleadings, CV 6.05CV155, US Dist. Ct. (ED TX), *Halliburton Energy Serv.* v. *M-I, LLC*, Jan. 26, 2006.

Defendant M-I, LLC's Reply in Support of its Motion for Summary Judgment of Invalidity with Respect to U.S. Patent No. 6,887,832 with exhibits, Apr. 18, 2006.

M-I, LLC's Responsive Brief on the Construction of the Asserted Claims of U.S. Patent No. 6,887,832 with exhibits, Apr. 18, 2006.

Halliburton's Unopposed Motion for Leave to Exceed Page Limit for Reply Brief on Claim Construction with the Reply Brief and other exhibits, Apr. 18, 2006.

U.S. Court of Appeals for the Federal Circuit opinion of Jan. 25, 2008 in *Halliburton Energy Services, Inc.* v. *M-I, LLC*, 2007-1149, re US Patent No. 6,887,832 (21 pages).

* cited by examiner

THINNERS FOR INVERT EMULSIONS

BACKGROUND OF THE INVENTION

1. Field of the Invention

This invention is generally related to methods and compositions for drilling and servicing wellbores in hydrocarbon bearing subterranean formations. Particularly, this invention is related to oil-based drilling fluid systems comprising water-in-oil invert emulsions, and to thinners that enhance or enable use of such fluids, at temperatures at or below about 50 degrees Fahrenheit (about 10 degrees Centigrade).

2. Description of Relevant Art

A drilling fluid, or "mud" which a drilling fluid is also often called, is a specially designed fluid that is circulated in a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

A drilling fluid typically comprises water and/or oil or synthetic oil or other synthetic material or synthetic fluid ("synthetic") as a base fluid, with solids in suspension. A non-aqueous based drilling fluid typically contains oil or synthetic as a continuous phase and may also contain water dispersed in the continuous phase by emulsification so that there is no distinct layer of water in the fluid. Such dispersed water in oil is generally referred to as an invert emulsion or water-in-oil emulsion.

A number of additives may be included in such oil based drilling fluids and invert emulsions to enhance certain properties of the fluid. Such additives may include, for example, emulsifiers, weighting agents, fluid-loss additives or fluid-loss control agents, viscosifiers or viscosity control agents, and alkali. Further general discussion and description of oil-based drilling fluids is provided in P. A. Boyd, et al., New Base Oil Used In Low Toxicity Oil Muds, Journal of Petroleum Technology, pages 137-142 (1985), which is incorporated herein by reference.

An essential criterion for assessing the utility of a fluid as a drilling fluid or as a well service fluid is the fluid's rheological parameters, particularly under drilling and wellbore conditions. For use as a drilling fluid, or as a fluid for servicing a well, the fluid must be capable of maintaining certain viscosities suitable for drilling and circulation in the wellbore. Preferably, a drilling fluid will be sufficiently viscous to be capable of supporting and carrying to the surface of the well drill cuttings without being so viscous as to interfere with the drilling operation. Moreover, a drilling fluid must be sufficiently viscous to be able to suspend barite and other weighting agents. However, increased viscosity can result in problematic sticking of the drill string, and increased circulating pressures can contribute to lost circulation problems.

Thinners may be added to the drilling fluid or drilling mud systems before and in the course of drilling. Anionic surfactants particularly from the group of the fatty alcohol sulfates, the fatty, alcohol ether sulfates and the alkylbenzenesulfonates are examples of such thinners known in the prior art. Although such compounds have been shown to effect thinning of drilling fluids, problems with such prior art thinners may occur when using the drilling muds at low temperatures (temperatures at or below about 50° F. (10° C.)).

At such low temperatures, despite the use of known prior art thinners, oil based drilling fluids typically have high or increased viscosity, which may render the fluids unusable for drilling. After pumping into the wellbore, drilling fluids may undergo heating from the formation, depending on the depth of the wellbore and the temperature of the formation. For example, heating in the range of about 150° to about 250° F. (about 66° to about 121° C.) is not uncommon and subterranean temperatures as high as about 350° F. (about 178° C.), particularly in very deep wellbores, are known. The Arctic region, for example, is known to have very low surface temperatures but very high subterranean temperatures. Even more problematic are deepwater wells (i.e., typically wells below at least about 1500 feet), which subject drilling fluids to chilling from cold waters surrounding the riser as the fluid returns to the surface from the high temperature subterranean formation. Such chilling of oil based drilling fluids typically increases their viscosity while such subterranean heating of oil based drilling fluids typically reduces their viscosity.

Preferably, thinners which reduce the viscosity of drilling fluids at low temperatures will not affect the viscosity of the fluids at high temperatures. That is, in many cases, a thinner is desired that is capable of "selectively" influencing the rheology or particularly reducing the viscosity of oil-based drilling fluids only at lower temperatures, such as may be encountered at the ground surface of the wellbore, or in the riser surrounded by waters above a deepwater offshore well, for example.

Thinners and other additives to drilling fluids, as well as drilling fluids employed in onshore and offshore wells, must commonly meet stringent environmental regulations related to biodegradability and toxicity. Further, drilling fluids and additives to drilling fluids must be able to withstand subterranean conditions that the fluids will typically encounter in a wellbore, such as high temperatures, high pressures, and pH changes.

A need exists for improved rheology-modifying or viscosity reducing additives to oil-based drilling fluids, and particularly to drilling fluids comprising invert (water-in-oil) emulsions, which are expected to be used in or to encounter low temperatures in drilling operations. As used herein, unless indicated otherwise, "low temperatures" shall be understood to mean temperatures at or below about 50° F. (about 10° C.).

SUMMARY OF THE INVENTION

According to the method of the present invention, a compound is added to a water-in-oil or invert emulsion drilling fluid or well service fluid which reduces the viscosity of the drilling fluid or well service fluid at low temperatures or which enables or enhances the ability of the drilling fluid or well service fluid to maintain its viscosity at low temperatures. The compound, which may be generally called a "thinner," continues to have this effect on a drilling fluid or well service fluid in drilling or servicing wellbores in subterranean formations, particularly hydrocarbon bearing subterranean formations. Further, this compound does not significantly affect the viscosity of the emulsion at high temperatures.

The compound has the following formula:

$$R-(C_2H_4O)_n(C_3H_6O)_m(C_4H_8O)_k-H$$

where R is a saturated or unsaturated, linear or branched alkyl radical having about 8 to about 24 carbon atoms, n is a number ranging from about 1 to about 10, m is a number ranging from about 0 to about 10, and k is a number ranging from about 0 to about 10.

The invention also comprises the composition of a water-in-oil or invert emulsion drilling fluid or well service fluid containing this thinner compound.

DETAILED DESCRIPTION OF PREFERRED EMBODIMENTS

The present invention provides a method of influencing the rheology, and particularly reducing the viscosity, of drilling fluids or well service fluids comprising invert (water-in-oil) emulsions. The method is particularly applicable to fluids for use in wellbores penetrating hydrocarbon bearing subterranean formations and has particular advantage in applications where the fluids are subjected to low temperatures, as in drilling or in servicing deepwater offshore wells. Such drilling fluids and well service fluids typically comprise a continuous oil phase, water dispersed in the oil phase, solids insoluble in the drilling fluid or well service fluid suspended in the fluid, and various additives. As the term is used herein, "invert emulsion" or "oil-in-water emulsion" is understood to mean the liquid portion of the drilling fluid comprising an emulsion (excluding solids). The term "invert emulsion drilling fluid" means the total sum of what is circulated as a drilling fluid.

In the method of this invention, a composition or compound having the following formula (I) is added to the invert emulsion or oil-based drilling fluid (or well service fluid) to reduce the viscosity of the fluid or to enhance the ability of the fluid to maintain its viscosity or to resist increasing viscosity at low temperatures. The compound may be added to the fluid during initial preparation of the fluid or later as the fluid is being used for drilling or well service purposes in the formation. The quantity added is an effective amount to maintain or effect the desired viscosity of the drilling fluid. For purposes of this invention, an "effective amount" of thinner of formula (I) is preferably from about 0.5 to about 15 pounds per barrel of drilling fluid or mud. A more preferred amount of thinner ranges from about 1 to about 5 pounds per barrel of drilling fluid and a most preferred amount is about 1.5 to about 3 pounds thinner per barrel of drilling fluid.

Formula (I) is:

$$R\text{—}(C_2H_4O)_n(C_3H_6O)_m(C_4H_8O)_k\text{-H} \qquad (I)$$

where R is a saturated or unsaturated, linear or branched, alkyl radical having about 8 to about 24 carbon atoms, n is a number ranging from about 1 to about 10, m is a number ranging from about 0 to about 10, and k is a number ranging from about 0 to about 10. Preferably, R has about 8 to about 18 carbon atoms; more preferably, R has about 12 to about 18 carbon atoms; and most preferably, R has about 12 to about 14 carbon atoms. Also, most preferably, R is saturated and linear.

The compositions or compounds of formula (I) may be prepared by customary techniques of alkoxylation, such as alkoxylating the corresponding fatty alcohols with ethylene oxide and/or propylene oxide or butylene oxide under pressure and in the presence of acidic or alkaline catalysts as is known in the art. Such alkoxylation may take place block-wise, i.e., the fatty alcohol may be reacted first with ethylene oxide, propylene oxide or butylene oxide and subsequently, if desired, with one or more of the other alkylene oxides. Alternatively, such alkoxylation may be conducted randomly, in which any desired mixture of ethylene oxide, propylene oxide and/or butylene oxide is reacted with the fatty alcohol.

In formula (I), the subscripts n and m respectively represent the number of ethylene oxide (EO) and propylene oxide (PO) molecules or groups in one molecule of the alkoxylated fatty alcohol. The subscript k indicates the number of butylene oxide (BO) molecules or groups. The subscripts n, m, and k need not be integers, since they indicate in each case statistical averages of the alkoxylation. Included without limitation are those compounds of the formula (I) whose ethoxy, propoxy, and/or butoxy group distribution is very narrow, such as for example, "narrow range ethoxylates" also called "NREs" by those skilled in the art.

To accomplish the purposes of this invention, the compound of formula (I) must contain at least one ethoxy group. Preferably, the compound of formula I will also contain at least one propoxy group ($C_3H_6O$—) or butoxy group ($C_4H_8O$—). Mixed alkoxides containing all three alkoxide groups—ethylene oxide, propylene oxide, and butylene oxide—are possible for the invention but are not preferred.

Preferably, for use according to this invention, the compound of formula (I) will have a value for m ranging from about 1 to about 10 with k zero or a value for k ranging from about 1 to about 10 with m zero. Most preferably, m will be about 1 to about 10 and k will be zero.

Other preferred compounds for use in the invention having the formula (I) above will have n ranging from about 1 to about 6, m ranging from about 1 to about 6, and k zero. Still other preferred compounds for use in the invention having the formula (I) above will have n ranging from about 2 to about 5, and m being about 3 or about 4 with k zero. It is particularly advantageous to establish the distribution of ethylene oxide and propylene oxide groups in the compounds of formula (I) in an ethylene oxide to propylene oxide ratio of about 1:1 to about 2:1, or even more preferably, about 2:1.5.

Additional preferred compounds for use in the invention having formula (I) above will have alkyl radicals containing about 12 to about 18 carbon atoms, or more preferably about 12 to about 14 carbon atoms, with subscripts n and m each having values of about 4 or about 5.

Used as thinners according to the method of the invention, the compounds of formula (I) reduce the viscosity or lower the yield point of the drilling fluid to which they are added. These thinners are particularly effective at low temperatures, i.e., temperatures at or below about 50° F. (about 10° C.) and most particularly effective at temperatures at or below about 40° F. (about 4° C.). The lower limit of effectiveness for these thinners is about 14° F. (about −10° C.). The thinners do not significantly influence or affect the rheology of drilling fluids at high temperatures, particularly temperatures ranging from about 100 to about 250° F. or more.

The compounds of formula (I) are biodegradable and are of little or no toxicity. They are expected to be capable of meeting increasingly stringent environmental regulations affecting the oil and gas industry worldwide.

Example drilling fluids comprising invert (water-in-oil) emulsions of particular use in the method of the invention generally have an oil phase comprising diesel oil, paraffin oil and/or mineral oil, or a synthetic oil. Alternatively, other carrier fluids may be used such as carboxylic esters, alcohols, ethers, internal olefins, alphaolefins (IO and/or AO), and polyalphaolefins (PAO), which may be branched or unbranched but are preferably linear and preferably ecologically acceptable (non-polluting oils). Preferably, the oils or carrier fluids used for the oil phase of the drilling fluid will be comprised of compounds which are flowable and pumpable at temperatures above about 32° F. (about 0° C.) or at least as low as about 40° F. (about 5° C.) as well as at higher temperatures. For example, compounds selected from one or more of the following groups or classes below are believed particularly suitable to comprise the oil phase of drilling fluids used in the present invention:

(a) most preferably, carboxylic esters of the formula:

R'—COO—R"  (II)

where R' is a saturated or unsaturated, linear or branched, alkyl radical having about 5 to about 23 carbon atoms and R" is an alkyl radical, branched or unbranched, saturated or unsaturated, having about 1 to about 22 carbon atoms;

(b) also preferably, linear or branched olefins having about 8 to about 30 carbon atoms;

(c) water-insoluble symmetric or asymmetric ethers of monohydric alcohols of natural or synthetic origin, said alcohols containing about 1 to about 24 carbon atoms;

(d) water-insoluble alcohols of the formula:

R'''—OH  (III)

where R''' is a saturated, unsaturated, linear or branched alkyl radical having about 8 to about 24 carbon atoms; and (e) carbonic diesters.

Such suitable oils are taught further, for example, in: European Patent Applications 0 374 671, 0 374,672, 0 382 070, and 0 386 638 of Cognis; European Laid-Open Specification 0 765 368 of Cognis (linear olefins); European Application 0 472 557 (water insoluble symmetric or asymmetric ethers of monohydric alcohols of natural or synthetic origin containing about 1 to about 24 carbon atoms); European Application 0 532 570 (carbonic diesters). Carboxylic esters of formula (II) above are preferred for the oil phase of drilling fluids used in this invention and particularly preferred are the esters described in European Laid-Open Specification EP 0 374 672 and EP 0 386 636.

In a preferred embodiment of this invention, compounds of formula (I) are added to drilling fluids comprising invert emulsions having an oil phase comprising esters of formula (II) where the radical R' in formula (II) is an alkyl radical having about 5 to about 21 carbon atoms (or more preferably about 5 to about 17 carbon atoms or most preferably about 11 to about 17 carbon atoms). Particularly suitable alcohols for making such esters are branched or unbranched alcohols with about 1 to about 8 carbon atoms, for example, methanol, isopropanol, isobutanol, and 2-ethylhexanol. Alcohols having about 12 to about 18 carbon atoms may alternatively be preferred for making other esters suitable for the invention.

For example, additional preferred esters for the oil phase of drilling fluids used in the invention include, without limitation: saturated C12-C14 fatty acid esters and unsaturated C16-C18 fatty acids (with isopropyl-, isobutyl- or 2-ethylhexanol as the alcohol component); 2-ethylhexyl octanoate; acetic acid esters, especially acetates of C16-C18 fatty alcohols; branched carboxylic esters disclosed in WO 99/33932 of Chevron or EP 0 642 561 of Exxon; alpha olefin mixtures disclosed in EP 0 765 368 A1 of Cognis and Halliburton; and blends of these various esters.

The oil phase of the emulsions of the drilling fluids used in the invention is preferably comprised of at least about 50% by volume of one or more preferred compounds (a)-(e) above. More preferably, such preferred compounds comprise about 60% to about 80% by volume of said oil phase, and most preferably, such preferred compounds comprise about 100% of the oil phase.

Water is preferably present in the liquid phase of the drilling fluids used in the invention, and preferably in amounts not less than about 0.5% by volume (excluding solids in the liquid phase). In a preferred embodiment of this invention, thinners of formula (I) are added to drilling fluids comprising invert emulsions containing about 15 to about 35% by volume water and more preferably 20% by volume water and about 80% by volume oil phase. To compensate for the osmotic gradient between the drilling mud and the formation or connate water, water in drilling fluids used in the present invention typically includes fractions of electrolytes, such as calcium salts and/or sodium salts. $CaCl_2$ in particular is frequently used, although other salts from the group of alkali metals and/or alkaline earth metals are also suitable, with potassium acetates and formates being common examples.

Preferred drilling fluids used in this invention have the following rheology: plastic viscosity (PV) in the range of about 10 to about 60 cP, and preferably in the range of about 15 to about 40 cP, and yield point (YP) in the range of about 5 to about 40 lb/100 ft$^2$, and preferably in the range of about 10 to about 25 lb/100 ft$^2$, at about 122° F. (about 50° C.). At lower temperatures, i.e., at or below about 40° F. (about 4° C.), the YP should not exceed about 75 lb/100 ft$^2$, and should preferably be in the range of about 10 to about 65 lb/100 ft$^2$, more preferably about 15 to about 45 lb/100 ft$^2$, and most preferably less than about 35 lb/100 ft$^2$. A preferred practicable lower limit for YP for drilling fluids used in this invention is about 5 lb/100 ft$^2$.

Methods for determining these parameters of PV and YP are well known to those skilled in the art. An example reference is "Manual of Drilling Fluids Technology", particularly the chapter on Mud Testing, available from Baroid Drilling Fluids, Inc., in Houston, Tex. (USA), incorporated herein by reference.

The solids content (not including low gravity solids), or the amount of weighting agents, in drilling fluids used in this invention is preferably about 0 to about 500 lb/bbl, and most preferably about 150 to about 350 lb/bbl. The mud weight, i.e., the density of the drilling fluids, is preferably in the range of about 8 to about 18 lb/gal. and more preferably about 9 to about 15 lb/gal. Such solids, or weighting agents, which serve to increase the density of the drilling fluids, may be any solids known to those skilled in the art as useful for such purpose, but will preferably be inert or environmentally friendly.

Drilling fluids used in this invention may optionally also contain other additives known to those skilled in the art, such as fluid-loss control additives and emulsifiers. Alkali may also be used, preferably lime (calcium hydroxide or calcium oxide), to bind or react with acidic gases (such as $CO_2$ and $H_2S$) encountered during drilling in the formation. Such alkali, or an alkali reserve, is known to prevent hydrolysis by acidic gases of generally acid-labile esters of the drilling fluid. Preferred quantities of free lime in the drilling fluids range from about 1 to about 10 lbs/bbl, and more preferably about 1 to about 4 lbs/bbl, although lower ranges such as less than about 2 lbs/bbl are preferred for certain esters that tend to hydrolyze in the presence of alkaline compounds as will be known to those skilled in the art. Other suitable agents as an alternative to lime may also be used to adjust and/or stabilize invert emulsions of the drilling fluids with respect to acids. An example of such alternative agents is a protonated amine, as described in U.S. Pat. No. 5,977,031.

Further optional additives that may be present in the drilling fluids used in this invention include electrolytes, such as calcium chloride, organophilic bentonite and organophilic lignite. Glycols and/or glycerol may also be added. Still further, dispersion aids, corrosion inhibitors and/or defoamers may be used. These and other suitable auxiliaries and additives are used in amounts known to those skilled in the art depending on the conditions of the particular wellbore and subterranean formation.

Although the invention has primarily been described in the context of a method of using compounds of formula (I) as thinners for drilling fluids at low temperatures, the compounds of formula (I) may also be effective as thinners for well service fluids such as spotting fluids or workover fluids at low temperatures.

Further description and use of the invention is shown by the following examples:

EXAMPLES

To show the effect of the invention, the following experiments were conducted. In each case an invert emulsion drilling mud system of the following general composition was prepared:

| | | |
|---|---|---|
| Ester | bbl | 0.496 |
| Water | bbl | 0.233 |
| Emulsifier | lb | 6.0 |
| Organophilic bentonite | lb | 1.0 |
| Organophilic lignite | lb | 5.0 |
| Alkali reserve (lime) | lb | 1.5 |
| $CaCl_2 \times 2\, H_2O$ | lb | 27.2 |
| Barite | lb | 314.0 |
| Dispersing auxiliary | lb | 0.5 |
| Thinner | lb/bbl | 2.0 |

The oil phase (A) used was a 2-ethylhexyl octanoate as disclosed in EP 0 386 636. The emulsifier used was the product EZ MUL NTE (Baroid Drilling Fluids Inc., Houston, Tex.). The oil/water ratio was 70/30 in each case. Measurements were carried out on a system without thinner (C1), and with a $C_{12/14}$ fatty alcohol sulfate +2 EO, sodium salt (C2), with a $C_{12}$ ether sulfate, sodium salt (C3) and with an oleic acid sulfonate disodium salt (C4), respectively, as prior art thinners, and comparison was made with these thinners and with compounds of formula (I) in accordance with the invention. The formula (I) compounds used for this purpose were as follows:

E1 C12/C14 fatty alcohol containing 2 EO and 4 PO
E2 C12/C14 fatty alcohol containing 5 EO and 4 PO
E3 C12/C18 fatty alcohol containing 5 EO and 4 PO
E4 C12/C14 fatty alcohol containing 6 EO and 4 PO The invert muds were prepared in a conventional manner and subsequently, at 40° F. and 122° F., the rheological characteristics of plastic viscosity (PV) and yield point (YP) and the gel strength after 10 seconds and 10 minutes using a Fann SR12 rheometer (from Fann) were determined.

Measurements E5, E6 and E7 were carried out using the thinners E1, E2 and E4, but in contrast to the details above, 45 lb of solids (rev dust, i.e., filter ash) were also added to each of the muds, in order to demonstrate the advantageous action of the compounds of formula (I) used in accordance with the invention in the case of high solids loading of the emulsions. In these cases, the measurements were taken only after 16 hours of aging at 150° F. The thinner was not added to the muds E5 to E7 until after aging.

The results of the measurements are given in Tables 1a and 1b below.

TABLE 1a

| | C1 | C1 | C2 | C2 | C3 | C3 | C4 | C4 | E1 | E1 | E2 | E2 | E3 | E3 | E4 | E4 |
|---|---|---|---|---|---|---|---|---|---|---|---|---|---|---|---|---|
| Temp. ° F. | 40 | 122 | 40 | 122 | 40 | 122 | 40 | 122 | 40 | 122 | 40 | 122 | 40 | 122 | 40 | 122 |
| PV (cP) | 94 | 28 | 105 | 30 | n.m. | 33 | 91 | 24 | 93 | 31 | 87 | 28 | 94 | 28 | 83 | 29 |
| YP lb/100 ft$^2$ | 68 | 29 | 71 | 35 | n.m. | 62 | 69 | 20 | 70 | 41 | 34 | 33 | 62 | 41 | 30 | 30 |
| Gels 10"/10' | 27/29 | 12/13 | 24/29 | 15/15 | n.m. | 26/31 | 25/25 | 6/7 | 25/28 | 17/19 | 11/13 | 14/16 | 20/24 | 17/18 | 8/11 | 13/14 | n.m: not measurable

TABLE 1b

Measurements with addition of 45 lb rev dust

|  | C1 | C1 | E5 | E5 | E6 | E6 | E7 | E7 |
|---|---|---|---|---|---|---|---|---|
| Temperature °F. | 40 | 122 | 40 | 122 | 40 | 122 | 40 | 122 |
| PV (cP) | 94 | 28 | 107 | 37 | 108 | 40 | 106 | 37 |
| YP lb/100 ft$^2$ | 68 | 29 | 37 | 23 | 72 | 42 | 46 | 30 |
| Gels 10"/10' | 27/29 | 12/13 | 12/14 | 7/9 | 26/30 | 14/18 | 17/19 | 12/14 |

The data, especially for the yield point (YP), clearly indicate the advantageous thinning effect of the compounds of formula (I) used in the method and in the emulsions of the invention, especially at low temperatures, in comparison to the prior art. The higher plastic viscosity for E5 to E7 is attributable to the higher proportion of solids in the mud systems.

Figure 1:
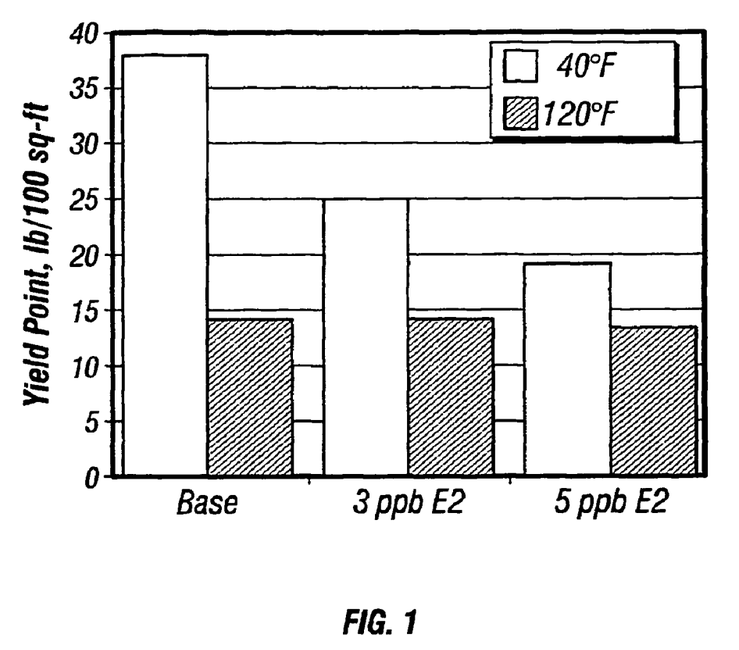
FIG. 1 is a graph comparing yield point of mud systems with and without thinners of the invention tested as reported in Table 2 at different temperatures.
Figure 2:
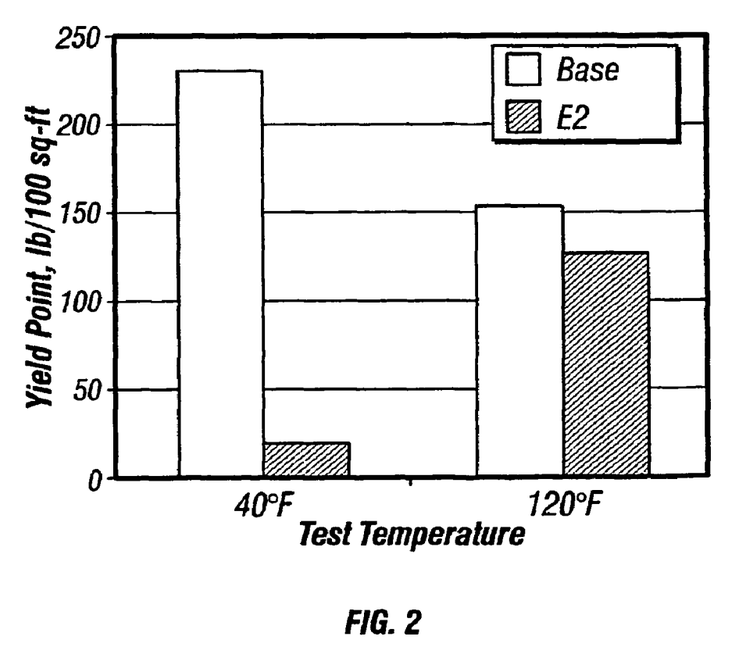
FIG. 2 is a graph comparing yield point of mud systems with and without thinners of the invention tested as reported in Table 3 at different temperatures.
Figure 3:
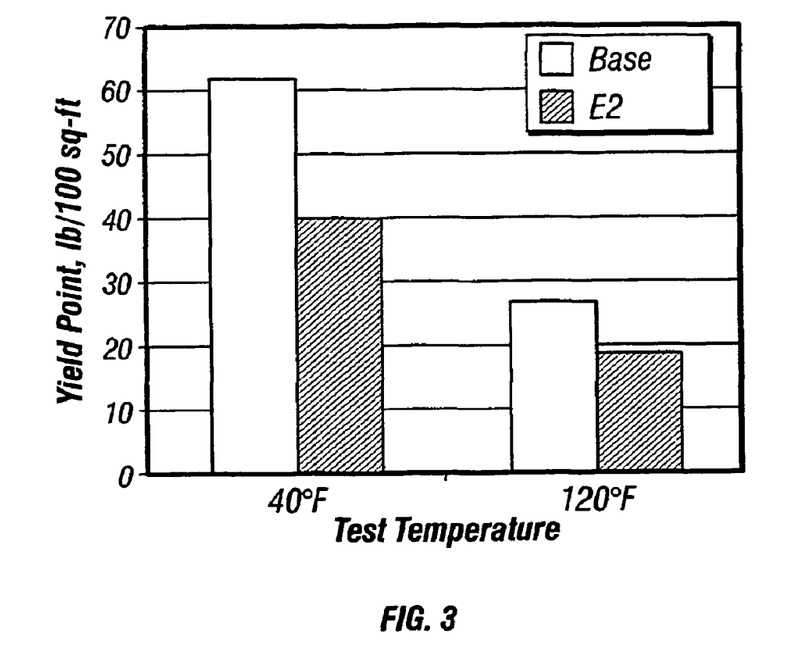
FIG. 3 is a graph comparing yield point of mud systems with and without thinners of the invention tested as reported in Table 4 at different temperatures.
Figure 4:
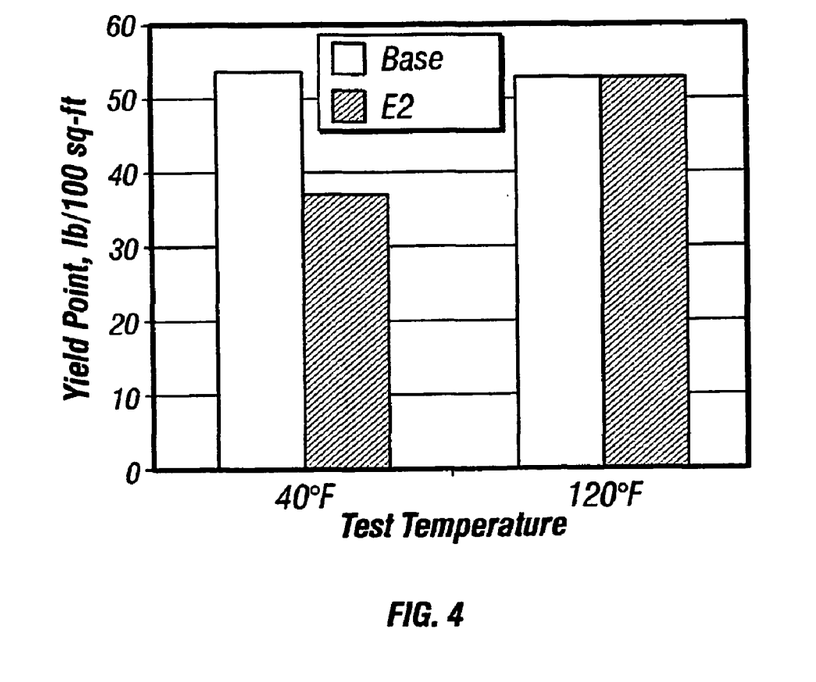
FIG. 4 is a graph comparing yield point of mud systems with and without thinners of the invention tested as reported in Table 5 at different temperatures.
Figure 5:
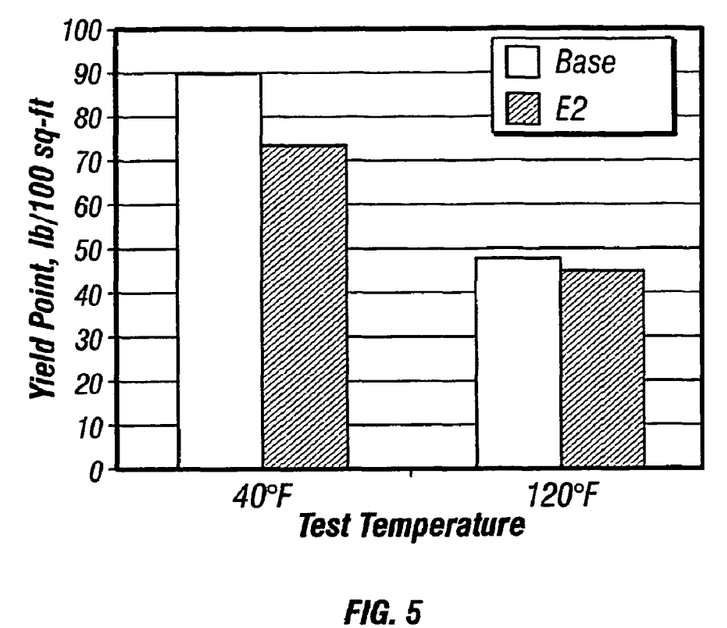
FIG. 5 is a graph comparing yield point of mud systems with and without thinners of the invention tested as reported in Table 6 at different temperatures.
Figure 6:
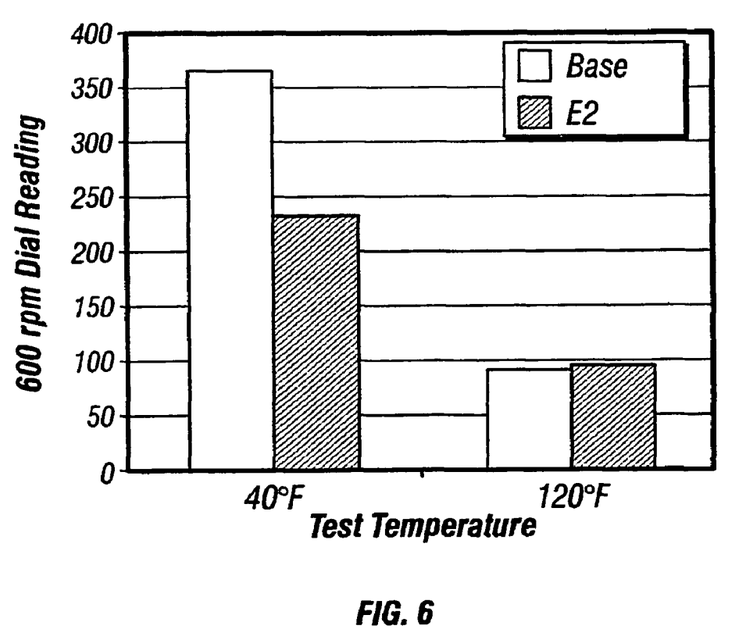
FIG. 6 is a graph comparing yield point of mud systems with and without thinners of the invention tested as reported in Table 7 at different temperatures.
Figure 7:
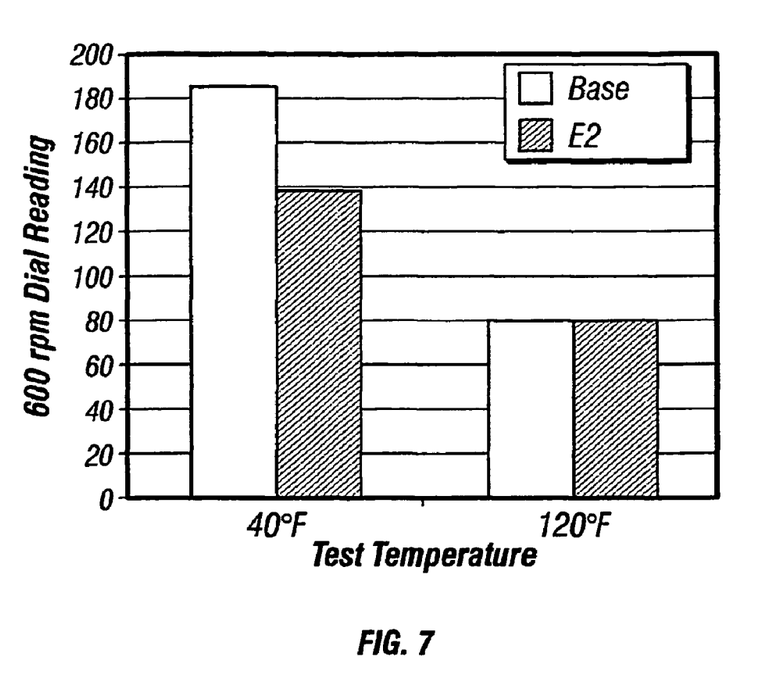
FIG. 7 is a graph comparing yield point of mud systems with and without thinners of the invention tested as reported in Table 8 at different temperatures.
Figure 8:
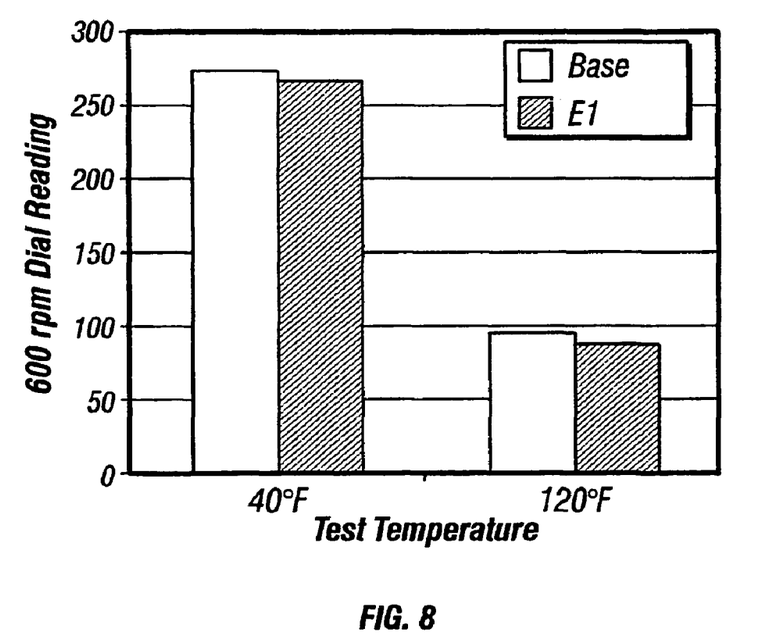
FIG. 8 is a graph comparing yield point of mud systems with and without thinners of the invention tested as reported in Table 9 at different temperatures.

Further experiments may be seen in Tables 2 to 9. In these cases, the yield point (YP) of the systems tested was investigated at different temperatures and depicted as a graph. This illustrates particularly well the advantageous influence of the compounds of formula (I) on the rheology at low temperatures (40° F., 4° C.) without any marked influence at high temperatures (120° F., 50° C.). The measurements were carried out using a Fann 35 viscometer (from Fann). The tables also indicate the dial readings at different speeds of rotation per minute (rpm).

In Tables 2 to 9:
PETROFREE LV® (is 2-ethylhexyl octanoate (from Cognis, Germany)
PETROFREE LE® is linear alpha-olefin (from Cognis, Germany)
PETROFREE® is C8-14 fatty acid 2-ethylhexyl ester (from Cognis, Germany)
GELTONE II® is organophilic bentonite (from Baroid, Houston, Tex.)
Thinner E1 is Formula I C12/C14 fatty alcohol of the invention containing 2 EO and 4 PO
Thinner E2 is Formula I C12/C14 fatty alcohol of the invention containing 5 EO and 4PO

TABLE 2

| Mud system | PETROFREE LV | | | | | |
|---|---|---|---|---|---|---|
| Mud weight, lb/gal | 14.0 | | | | | |
| Oil/water ratio | 70/30 | | | | | |
| Contaminant | Drill solids | | | | | |
| E2, lb/bbl | 0 | | 3 | | 5 | |
| Temperature, °F. | 40 | 120 | 40 | 120 | 40 | 120 |
| Plastic viscosity, cP | 118 | 40 | 113 | 34 | 107 | 35 |
| Yield point, lb/100 ft$^2$ | 38 | 14 | 25 | 14 | 19 | 13 |
| 10 sec gel, lb/100 ft$^2$ | 16 | 6 | 10 | 6 | 6 | 6 |
| 10 min gel, lb/100 ft$^2$ | 22 | 11 | 13 | 8 | 9 | 8 |
| Fann 35 dial readings | | | | | | |
| 600 rpm | 274 | 94 | 251 | 82 | 233 | 83 |
| 300 rpm | 156 | 54 | 138 | 48 | 126 | 48 |
| 200 rpm | 114 | 40 | 97 | 35 | 88 | 35 |
| 100 rpm | 70 | 25 | 56 | 22 | 49 | 22 |
| 6 rpm | 17 | 6 | 10 | 7 | 7 | 6 |
| 3 rpm | 14 | 5 | 7 | 6 | 5 | 5 |

TABLE 3

| Mud system | PETROFREE | | | |
|---|---|---|---|---|
| Mud weight, lb/gal | 14.0 | | | |
| Oil/water ratio | 75/25 | | | |
| Contaminant | Excess GELTONE II | | | |
| E2, lb/bbl | 0 | | 3 | |
| Temperature, °F. | 40 | 120 | 40 | 120 |
| Plastic viscosity, cP | 180 | 51 | 126 | 50 |
| Yield point, lb/100 ft$^2$ | 230 | 152 | 19 | 125 |
| 10 sec gel, lb/100 ft$^2$ | 108 | 64 | 10 | 50 |
| 10 min gel, lb/100 ft$^2$ | 110 | 66 | 13 | 52 |
| Fann 35 dial readings | | | | |
| 600 rpm | 590 | 254 | 271 | 225 |
| 300 rpm | 410 | 203 | 145 | 175 |
| 200 rpm | 336 | 179 | 103 | 149 |
| 100 rpm | 248 | 146 | 59 | 119 |
| 6 rpm | 112 | 79 | 10 | 62 |
| 3 rpm | 100 | 70 | 8 | 58 |

TABLE 4

| Mud system | PETROFREE LV | | | |
|---|---|---|---|---|
| Mud weight, lb/gal | 16.0 | | | |
| Oil/water ratio | 80/20 | | | |
| Contaminant | Drill solids | | | |
| E2, lb/bbl | 0 | | 3 | |
| Temperature, °F. | 40 | 120 | 40 | 120 |
| Plastic viscosity, cP | 152 | 51 | 142 | 40 |
| Yield point, lb/100 ft$^2$ | 62 | 27 | 40 | 19 |
| 10 sec gel, lb/100 ft$^2$ | 22 | 10 | 18 | 10 |
| 10 min gel, lb/100 ft$^2$ | 48 | 26 | 22 | 12 |
| Fann 35 dial readings | | | | |
| 600 rpm | 366 | 129 | 324 | 99 |
| 300 rpm | 214 | 78 | 182 | 59 |
| 200 rpm | 158 | 59 | 130 | 45 |
| 100 rpm | 98 | 38 | 78 | 30 |
| 6 rpm | 24 | 11 | 16 | 10 |
| 3 rpm | 20 | 9 | 12 | 9 |

TABLE 5

| Mud system | PETROFREE | | | |
|---|---|---|---|---|
| Mud weight, lb/gal | 11.0 | | | |
| Oil/water ratio | 70/30 | | | |
| Contaminant | Excess GELTONE II | | | |
| E2, lb/bbl | 0 | | 3 | |
| Temperature, °F. | 40 | 120 | 40 | 120 |
| Plastic viscosity, cP | 132 | 31 | 88 | 29 |
| Yield point, lb/100 ft$^2$ | 54 | 53 | 37 | 53 |
| 10 sec gel, lb/100 ft$^2$ | 33 | 23 | 13 | 26 |
| 10 min gel, lb/100 ft$^2$ | 38 | 27 | 17 | 30 |
| Fann 35 dial readings | | | | |
| 600 rpm | 318 | 115 | 213 | 111 |
| 300 rpm | 186 | 84 | 125 | 82 |
| 200 rpm | 139 | 71 | 90 | 70 |
| 100 rpm | 91 | 54 | 56 | 55 |
| 6 rpm | 35 | 25 | 15 | 28 |
| 3 rpm | 32 | 21 | 13 | 25 |

TABLE 6

| Mud system | PETROFREE | | | |
|---|---|---|---|---|
| Mud weight, lb/gal | 11.0 | | | |
| Oil/water ratio | 70/30 | | | |
| Contaminant | Drill solids | | | |
| E2, lb/bbl | 0 | | 3 | |
| Temperature, °F. | 40 | 120 | 40 | 120 |
| Plastic viscosity, cP | 110 | 34 | 113 | 34 |
| Yield point, lb/100 ft$^2$ | 90 | 47 | 73 | 44 |

TABLE 6-continued

| | | | | |
|---|---|---|---|---|
| 10 sec gel, lb/100 ft² | 38 | 21 | 27 | 20 |
| 10 min gel, lb/100 ft² | 44 | 24 | 30 | 22 |
| Fann 35 dial readings | | | | |
| 600 rpm | 310 | 115 | 299 | 112 |
| 300 rpm | 200 | 81 | 186 | 78 |
| 200 rpm | 157 | 67 | 142 | 64 |
| 100 rpm | 110 | 50 | 95 | 48 |
| 6 rpm | 42 | 23 | 31 | 22 |
| 3 rpm | 38 | 21 | 27 | 19 |

TABLE 7

| Mud system | PETROFREE LE | | | |
|---|---|---|---|---|
| Mud weight, lb/gal | 16.4 | | | |
| E2, lb/bbl | 0 | | 3 | |
| Temperature, °F. | 40 | 120 | 40 | 120 |
| Plastic viscosity, cP | 173 | 40 | 107 | 43 |
| Yield point, lb/100 ft² | 21 | 9 | 18 | 7 |
| 10 sec gel, lb/100 ft² | 16 | 8 | 11 | 8 |
| 10 min gel, lb/100 ft² | 19 | 11 | 15 | 11 |
| Fann 35 dial readings | | | | |
| 600 rpm | 367 | 89 | 232 | 93 |
| 300 rpm | 194 | 49 | 125 | 50 |
| 200 rpm | 135 | 35 | 88 | 37 |
| 100 rpm | 74 | 22 | 50 | 22 |
| 6 rpm | 12 | 5 | 9 | 6 |
| 3 rpm | 10 | 4 | 7 | 5 |

TABLE 8

| Mud system | PETROFREE LE | | | |
|---|---|---|---|---|
| Mud weight, lb/gal | 11.6 | | | |
| E2, lb/bbl | 0 | | 3 | |
| Temperature, °F. | 40 | 120 | 40 | 120 |
| Plastic viscosity, cP | 80 | 31 | 56 | 32 |
| Yield point, lb/100 ft² | 25 | 18 | 27 | 16 |
| 10 sec gel, lb/100 ft² | 12 | 8 | 17 | 9 |
| 10 min gel, lb/100 ft² | 20 | 11 | 23 | 11 |
| Fann 35 dial readings | | | | |
| 600 rpm | 185 | 80 | 139 | 80 |
| 300 rpm | 105 | 49 | 83 | 48 |
| 200 rpm | 77 | 37 | 63 | 37 |
| 100 rpm | 46 | 24 | 43 | 24 |
| 6 rpm | 11 | 7 | 14 | 8 |
| 3 rpm | 9 | 6 | 13 | 7 |

TABLE 9

| Mud system | PETROFREE LV | | | |
|---|---|---|---|---|
| Mud weight, lb/gal | 14.0 | | | |
| Oil/water ratio | 70/30 | | | |
| Contaminant | Drill solids | | | |
| E1, lb/bbl | 0 | | 3 | |
| Temperature, °F. | 40 | 120 | 40 | 120 |
| Plastic viscosity, cP | 118 | 40 | 113 | 35 |
| Yield point, lb/100 ft² | 38 | 14 | 41 | 16 |
| 10 sec gel, lb/100 ft² | 16 | 6 | 16 | 9 |
| 10 min gel, lb/100 ft² | 22 | 11 | 20 | 11 |
| Fann 35 dial readings | | | | |
| 600 rpm | 274 | 94 | 267 | 86 |
| 300 rpm | 156 | 54 | 154 | 51 |
| 200 rpm | 114 | 40 | 114 | 39 |
| 100 rpm | 70 | 25 | 71 | 26 |
| 6 rpm | 17 | 6 | 18 | 8 |
| 3 rpm | 14 | 5 | 14 | 8 |

The foregoing description of the invention is intended to be a description of preferred embodiments. Various changes in the details of the described composition and method can be made without departing from the intended scope of this invention as defined by the appended claims.

We claim:

1. A method of influencing the rheology of a drilling fluid or well service fluid comprising an invert emulsion, said method comprising adding to said drilling fluid or well service fluid a compound having the formula:

$$R-(C_2H_4O)_n(C_3H_6O)_m(C_4H_8-O)_k-H$$

where R is a saturated or unsaturated, linear or branched alkyl radical having about 8 to about 24 carbon atoms, n is a number ranging from about 1 to about 10, m is a number ranging from about 1 to about 10, and k is a number ranging from about 0 about 10, such that the ratio of n to m ranges from about 1:1 to about 2:1, and wherein said compound reduces the viscosity and/or lowers the yield point of the drilling fluid or well service fluid at temperatures at or below about 50° F., and wherein the compound is added i) during drilling or ii) when the drilling fluid or well service fluid is circulating in a subterranean formation.

2. The method of claim 1 wherein in said formula, k is zero and the ratio of n to m is about 2:1.5.

3. The method of claim 1 wherein in said formula, n is a number ranging from about 1 to about 6, m is a number ranging front about 1 to about 6, and k is zero.

4. The method of claim 1 wherein said invert emulsion to which said compound has been added comprises a continuous oil phase comprising compounds or compositions flowable and pumpable at temperatures at least as low as about 40 degrees Fahrenheit.

5. The method of claim 4 wherein said oil phase comprises synthetic compounds or compositions selected from the group consisting of: (a) carboxylic esters of the formula: R'—COO—R" where R' is a saturated or unsaturated, linear or branched, alkyl radical having about 1 to about 23 carbon atoms and R" is an alkyl radical, branched or unbranched, saturated or unsaturated, having about 1 to about 23 carbon atoms; (b) linear or branched olefins having about 8 to about 30 carbon atoms; (c) water-insoluble symmetric or asymmetric ethers of monohydric alcohols of natural or synthetic origin, said alcohols containing about 1 to about 24 carbon atoms; (d) water-insoluble alcohols of the formula: R'''—OH where R''' is a saturated, unsaturated, linear or branched alkyl radical having about 8 to 24 carbon atoms; and (e) carbonic diesters.

6. The method of claim 1 wherein said compound is added to said drilling fluid or well service fluid in an amount of about 0.5 to about 1 pound per barrel of said drilling fluid or well service fluid.

7. The method of claim 1 wherein said compound is added to said drilling fluid or well service fluid in quantities ranging from about 0.5 pounds to about 15.0 pounds of said compound per barrel of said drilling fluid or well service fluid.

8. The method of claim 1 wherein said compound does not significantly affect the viscosity of said fluid at temperatures ranging from about 100° F. to about 250° F.

9. The method of claim 1 wherein said compound is also added to said fluid when said fluid is prepared.

10. The method of claim 1 wherein said compound is added to said fluid while said fluid is circulating in a wellbore.

11. The method of claim 1 wherein, in said formula, R has about 12 to about 18 carbon atoms, n and m each have values of about 4 or about 5 and k is zero.

12. The method of claim 1 wherein said compound reduces the viscosity of the drilling fluid at 50° F.

13. The method of claim 1 wherein said compound reduces the viscosity of the drilling fluid at temperatures below 50° F.

14. The method of claim 1 wherein said compound lowers the yield point of the drilling fluid at 50° F.

15. The method of claim 1 wherein said compound lowers the yield point of the drilling fluid at temperatures below 50° F.

16. A method of reducing the viscosity of an invert emulsion drilling fluid or well service fluid at temperatures less than about 50° F. without significantly affecting the viscosity of the fluid at temperatures in the range of about 100° F. to about 250° F., said method comprising adding to said fluid an effective amount of thinner compound having the formula:

where R is a saturated or unsaturated, linear or branched alkyl radical having about 8 to about 24 carbon atoms, n is a number ranging from about 1 to about 10, m is a number ranging from about 1 to about 10, such that the ratio of n to m ranges from about 1:1 to about 2:1 and k is a number about 0 and the viscosity of the fluid is reduced at temperatures less than about 50° F. without significantly being affected at temperatures in the range of about 100° F. to about 250° F.; and wherein the oil phase of the invert emulsion is synthetic, comprising about 50% to about 100% compounds or compositions selected from the group consisting of: (a) carboxylic esters of the formula: R'—COO—R" where R' is a saturated or unsaturated, linear or branched, alkyl radical having about 1 to about 23 carbon atoms and R" is an alkyl radical, branched or unbranched, saturated or unsaturated, having about 1 to about 23 carbon atoms; (b) linear or branched olefins having about 8 to about 30 carbon atoms; (c) wafer-insoluble symmetric or asymmetric ethers of monohydric alcohols of natural or synthetic origin, said alcohols containing about 1 to about 24 carbon atoms; (d) water-insoluble alcohols of the formula: R'''—OH where R''' is a saturated, unsaturated, linear or branched alkyl radical having about 8 to about 24 carbon atoms; and (e) carbonic diesters, wherein said thinner compound is added i) during drilling or ii) when the fluid is circulating in a subterranean formation.

17. The method of claim 16 further comprising circulating said fluid in a wellbore and adding said compound to said fluid during said circulation.

18. The method of claim 16 further comprising preparing said fluid and wherein the compound is also added.

19. The method of claim 16 wherein in the first formula n and m have a ratio of 2:1.5.

20. The method of claim 16 wherein, after the thinner compound has been added, the fluid has a yield point in the range of about 5 to about 45 lb/100ft$^2$ at about 40° F.

* * * * *